(Model.)
R. Y. HOVEY.
ANIMAL TRAP.
No. 247,252. Patented Sept. 20, 1881.
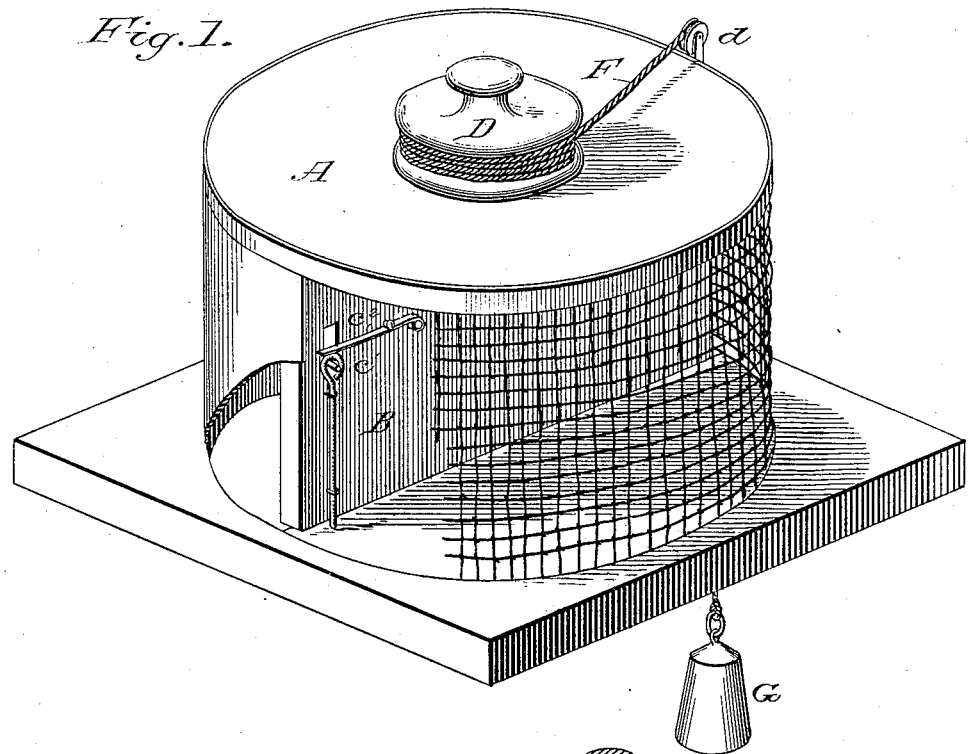
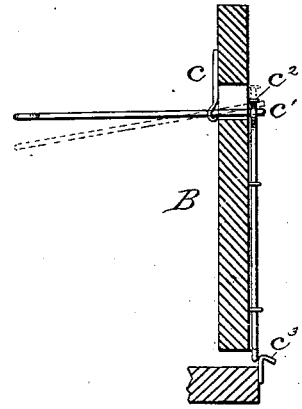
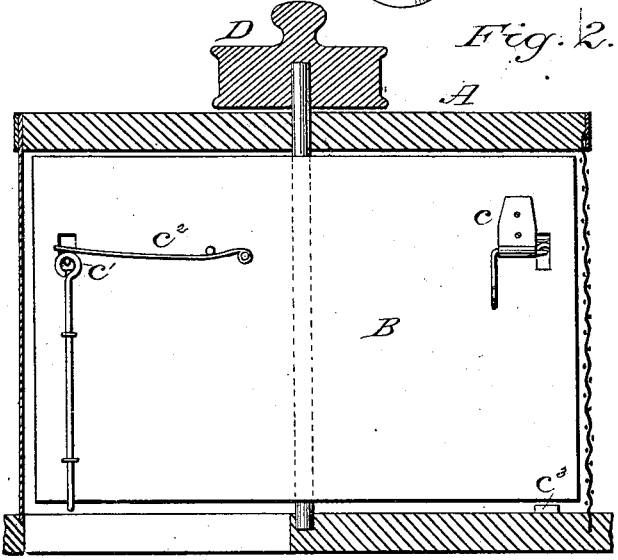
Witnesses:
Dennis L. Rogers
Malcolm M. Moore
Inventor:
Rossell Y. Hovey.
by Edwin A. Burlingame
his attorney in fact.
N. PETERS. Photo-Lithographer. Washington. D. C.

UNITED STATES PATENT OFFICE.

ROSSELL Y. HOVEY, OF GRAND RAPIDS, MICHIGAN.

ANIMAL-TRAP.

SPECIFICATION forming part of Letters Patent No. 247,252, dated September 20, 1881.

Application filed December 23, 1880. (Model.)

*To all whom it may concern:*

Be it known that I, ROSSELL Y. HOVEY, of the city of Grand Rapids, county of Kent, and State of Michigan, have invented a new and useful Improvement in Traps, of which the following is a specification, reference being had to the accompanying drawings, forming part of this application.

My invention relates to the construction of a self-setting cylindrical trap, the sides being constructed one-half of sheet-iron, wood, or other suitable material, which I call the "dark" side, the other side being constructed of wire-gauze, and having a hole cut through it where it joins the dark side, through which the animal enters the trap. The top and bottom are of wood or any suitable material, the top being close and the bottom having a semicircular piece cut out, so as to leave the dark side bottomless, having, also, a revolving partition, consisting of a single straight board set up edgewise and hung upon a pivot, so as to swing or revolve around in the inside of the cylinder. The pivot of the revolving partition projects through the top and terminates at the top in a pulley, around which is wound a cord, which again passes over another pulley at the edge of the cylinder, and to which cord is attached a weight, which furnishes or constitutes the motive power for operating the trap. At each end of the revolving partition is placed a simple device for springing the trap and for keeping the partition in place when the trap is set. This device consists of a piece of wire bent at right angles, which I call the "trip," held in place by a small loop; one end passes through the partition and connects with a straight piece of wire, which I call the "latch." This latch is held in place by a small spring, which presses it downward. Fastened to the bottom of the cylinder, at the side opposite the entrance, is a small catch, into which the latch plays.

In the drawings, Figure 1 is a perspective view of my improved trap. Fig. 2 is a sectional view of the same, and Fig. 3 is an end view of the revolving partition, showing the catch.

A represents the cylinder, having top, bottom, and sides constructed as above described; B, the revolving partition; c, the trip; c', the latch; $c^2$, the spring; $c^3$, the catch; D d, the pulleys; F, the cord; G, the weight.

To use the trap, fasten the bait securely upon the ends of the trips, wind up the weight until it hangs even with the bottom of the trap, and set the trap over a barrel half-full of water. When the rat or other animal seizes the bait he depresses the end of the trip, which lifts the latch free from the catch, when the weight causes the revolving partition to move about, and knocks the rat off into the barrel. The latch is stopped again at the catch, and the trap is thus again set, and baited by the other trip coming into place.

I am aware that a cylinder having an opening through the bottom thereof and an interior revolving gate or partition operated by a weight or spring is common in animal-traps, and such I do not wish to be understood as claiming, broadly, as of my invention.

What I claim as new, and desire to secure by Letters Patent, is—

The herein-described animal-trap, consisting of the cylinder A, with one-half of the side thereof composed of wire-gauze and the other half of wood or metal, and having openings in the side and bottom thereof respectively, and the revolving partition B, provided with the bait-trips c, the latches c', and the springs $c^2$, the several parts constructed and arranged relatively to each other as specified.

ROSSELL Y. HOVEY.

Witnesses:
DENNIS L. ROGERS,
EDWIN A. BURLINGAME.